(12) United States Patent
Hitnalli

(10) Patent No.: US 12,013,001 B2
(45) Date of Patent: Jun. 18, 2024

(54) COUPLING ARRANGEMENT

(71) Applicant: Volvo Truck Corporation, Gothenburg (SE)

(72) Inventor: Vishwanath Hitnalli, Karnataka (IN)

(73) Assignee: Volvo Truck Corporation, Gothenburg (SE)

(*) Notice: Subject to any disclaimer, the term of this patent is extended or adjusted under 35 U.S.C. 154(b) by 415 days.

(21) Appl. No.: 17/429,899

(22) PCT Filed: Nov. 15, 2019

(86) PCT No.: PCT/EP2019/081532
§ 371 (c)(1),
(2) Date: Aug. 10, 2021

(87) PCT Pub. No.: WO2020/164768
PCT Pub. Date: Aug. 20, 2020

(65) Prior Publication Data
US 2022/0205490 A1 Jun. 30, 2022

(30) Foreign Application Priority Data
Feb. 14, 2019 (IN) .............................. 201941005775

(51) Int. Cl.
*F16D 3/04* (2006.01)
*F16D 3/10* (2006.01)
*B62D 1/16* (2006.01)

(52) U.S. Cl.
CPC ................ *F16D 3/04* (2013.01); *F16D 3/10* (2013.01); *B62D 1/16* (2013.01); *Y10S 464/904* (2013.01);
(Continued)

(58) Field of Classification Search
CPC ..... F16D 3/04; F16D 3/10; B62D 1/16; Y10S 464/904; Y10T 74/18392; Y10T 74/18408
(Continued)

(56) References Cited

U.S. PATENT DOCUMENTS 238,839 A * 3/1881 Bond .................... F01L 1/02
74/67
2,067,513 A * 1/1937 Talbot .................... F16C 23/06
74/69
(Continued)

FOREIGN PATENT DOCUMENTS

| CN | 1149330 A | 5/1997 |
| CN | 102996753 A | 3/2013 |

(Continued)

OTHER PUBLICATIONS

International Search Report and Written Opinion for International Patent Application No. PCT/EP2019/081532, mailed Feb. 11, 2020, 12 pages.
(Continued)

*Primary Examiner* — Greg Binda
(74) *Attorney, Agent, or Firm* — Withrow & Terranova, PLLC

(57) ABSTRACT

A coupling arrangement for connection between a first rotatable shaft and a second rotatable shaft includes a first rotatable portion connectable to the first rotatable shaft, and a second rotatable portion connectable to the second rotatable shaft. The coupling arrangement includes a first reciprocating element mechanically connected to the first rotatable portion at a first interconnecting portion for transforming a rotating motion from the first rotatable portion to a linear motion of the first reciprocating element and a second reciprocating element mechanically connected to the second rotatable portion at a second interconnecting portion for transforming a linear motion from the second (Continued)

reciprocating element to a rotating motion of the second rotatable portion. The coupling arrangement includes a connecting element rotatably connected to each of the first reciprocating element and the second reciprocating element for allowing a relative rotation between the connecting element and the first and second reciprocating elements, respectively.

12 Claims, 3 Drawing Sheets

(52) U.S. Cl.
CPC .... *Y10T 74/18392* (2015.01); *Y10T 74/18408* (2015.01)

(58) Field of Classification Search
USPC .......................................... 464/102, 106, 147
See application file for complete search history.

(56) References Cited

U.S. PATENT DOCUMENTS

| | | | |
|---|---|---|---|
| 2,343,244 A * | 3/1944 | Lasenby | F16D 3/04 |
| | | | 464/103 |
| 3,396,553 A | 8/1968 | Potter | |
| 4,314,460 A * | 2/1982 | Mayfield | F16D 3/60 |
| | | | 464/69 |
| 6,012,906 A | 1/2000 | Kanamaru | |
| 9,752,718 B1 | 9/2017 | Wittig | |
| 2004/0106458 A1 | 6/2004 | Thompson | |
| 2006/0150763 A1 | 7/2006 | Raabe et al. | |
| 2008/0220886 A1 | 9/2008 | Mabuchi et al. | |
| 2009/0069099 A1* | 3/2009 | Utsunomiya | F16D 3/04 |
| | | | 464/103 |
| 2013/0068049 A1 | 3/2013 | Chang | |
| 2016/0169293 A1 | 6/2016 | Randle | |

FOREIGN PATENT DOCUMENTS

| | | |
|---|---|---|
| DE | 19506815 A1 | 8/1995 |
| EP | 1515884 A1 | 3/2005 |

OTHER PUBLICATIONS

International Preliminary Report on Patentability for International Patent Application No. PCT/EP2019/081532, mailed Nov. 18, 2020, 25 pages.
First Office Action for Chinese Patent Application No. 201980090912.3, mailed Feb. 14, 2023, 13 pages.
Examination Report for Indian Patent Application No. 201941005775, mailed Mar. 25, 2022, 5 pages.
US 5,823,882, 10/1998 (withdrawn)

* cited by examiner

COUPLING ARRANGEMENT

This application is a 35 USC 371 national phase filing of International Application No. PCT/EP2019/081532, filed Nov. 15, 2019, which in turn claims priority to Indian Patent Application No. 201941005775, filed Feb. 14, 2019, the disclosures of which are incorporated herein by reference in their entireties.

TECHNICAL FIELD

The present disclosure relates to a coupling arrangement for connection between a first and a second rotatable shaft. The coupling arrangement is particularly applicable between rotatable shafts of a vehicle, and more particularly for connection between an upper and a lower steering column of a vehicle. Although the coupling arrangement will mainly be described in relation to a truck, it may also be applicable for other types of vehicles comprising coupling arrangements for connection between rotatable shafts.

BACKGROUND

Coupling arrangements between rotating shafts are used in a wide variety of applications. In particular, coupling arrangements are used for transmitting power between two shafts, preferably by means of a constant velocity joint, where the rotational velocity and angular rotation is the same on each side of the coupling arrangement, providing a so-called 1:1 ratio between the shafts on each side of the coupling.

In the automotive industry, coupling arrangements of the above type are often used in the steering column for being able to provide an angular displacement between an upper steering column connectable to the steering wheel, and a lower steering column indirectly connectable to the wheels of the vehicle.

The coupling arrangements for vehicles thus enable for an angular displacement between a first and a second shaft connected thereto. However, in order to e.g. improve the flexibility and application of the coupling arrangements, there is a desire to be able to also provide a linear displacement between the shafts connected thereto.

SUMMARY

It is an object of the present disclosure to describe a coupling arrangement which at least partially overcomes the above described deficiencies. This is achieved by a coupling arrangement.

According to a first aspect, there is provided a coupling arrangement for connection between a first rotatable shaft and a second rotatable shaft, the coupling arrangement comprising a first rotatable portion connectable to the first rotatable shaft; a first reciprocating element mechanically connected to the first rotatable portion at a first interconnecting portion for transforming a rotating motion from the first rotatable portion to a linear motion of the first reciprocating element; a second rotatable portion connectable to the second rotatable shaft; a second reciprocating element mechanically connected to the second rotatable portion at a second interconnecting portion for transforming a linear motion from the second reciprocating element to a rotating motion of the second rotatable portion; and a connecting element rotatably connected to each of the first reciprocating element and the second reciprocating element for allowing a relative rotation between the connecting element and the first and second reciprocating elements, respectively.

The wording "interconnecting portion" should be construed as a mechanical interface between the rotatable portion and the reciprocating portion where the rotating motion from the rotatable portion is transformed into the reciprocating portion of the reciprocating element, and vice versa. Hence, the first reciprocating element and the first rotatable portion are mechanically connected to each other at the first interconnecting portion. The first interconnecting portion may form part of either one of the first reciprocating element or the first rotatable portion.

By means of the above, a rotating motion of the first rotatable portion, i.e. a rotating motion of the first rotatable shaft, is transformed into a reciprocating motion at the first interconnecting portion so as to provide a reciprocating motion by the first reciprocating element. The connecting element hereby moves in the same direction as the first reciprocating element. Since also the second reciprocating element is connected to the connecting element, the second reciprocating element will reciprocate in the same direction as the first reciprocating element. The reciprocating motion of the second reciprocating element will be transformed into a rotating motion at the second interconnecting portion thus providing a rotation of the second rotatable portion, and in turn a rotation of the second rotatable shaft. In other words, a rotational motion will be transformed into a reciprocating motion, whereby the reciprocating motion is again transformed into a rotational motion. The first rotatable shaft and the second rotatable shaft will hereby rotate with the same speed and in the same rotational direction.

The present disclosure is based on the insight that by rotatably connecting the first and second reciprocating elements to each other by means of at least one connecting element, both an angular displacement as well as an axial displacement between the first rotatable portion and the second rotatable portion can be achieved. An advantage is thus that the coupling arrangement enables for power transfer between a first and a second rotatable shaft while allowing for angular displacement, axial displacement, or a combination of both angular displacement and axial displacement. For pure angular displacement, one of the first reciprocating element and the second reciprocating element is rotated around the connecting element, while for a combination of angular displacement and axial displacement, both the first reciprocating element and the second reciprocating element are rotated around the connecting element. For a pure axial displacement between the first and second rotatable shafts, both the first reciprocating element and the second reciprocating element are rotated around the connecting element. Accordingly, further degrees of freedom for enabling displacement between rotatable shafts are achieved.

According to an example embodiment, the connecting element may be a first connecting element, the coupling arrangement may further comprise a second connecting element rotatably connected to each of the first reciprocating element and the second reciprocating element, wherein the first and second connecting elements are positioned on a respective end portion of the first and second reciprocating elements.

Hereby, increased stability of the coupling arrangement is achieved.

According to an example embodiment, the coupling arrangement may comprise a bearing arrangement between the connecting element and the first reciprocating element, the bearing arrangement allowing a rotation of the connecting element around a geometric axis defined by the longitudinal extension of the first reciprocating element.

The bearing arrangement may be of any suitable type for allowing a rotation of the connecting element around a geometric axis defined by the longitudinal extension of the first reciprocating element.

According to an example embodiment, the bearing arrangement may be arranged to prevent a relative linear motion between the connecting element and the first reciprocating element.

Other means may also be provided for preventing the relative linear motion. For example, instead of using a special bearing for preventing the relative linear motion, a circlips connected into a circumferential groove of the reciprocating element can be provided, which circlips is arranged in abutment with an outer end surface of the connecting element. As a further example, a washer plate may be connected between the reciprocating element and the connecting element. The washer plate may, for example, be connected at an outer end portion of the reciprocating element.

According to an example embodiment, the bearing arrangement may be a first bearing arrangement, the coupling arrangement may comprise a second bearing arrangement between the connecting element and the second reciprocating element, the second bearing arrangement allowing a rotation of the connecting element around a geometric axis defined by the longitudinal extension of the second reciprocating element.

According to an example embodiment, a direction of the linear motion of the first reciprocating element may be perpendicular to an axis around which the first rotatable portion rotates.

According to an example embodiment, a direction of the linear motion of the second reciprocating element may be perpendicular to an axis around which the second rotatable portion rotates.

According to an example embodiment, the first interconnecting portion may comprise a first elongated groove and a first pin, the first pin being slidable between end portions of the first elongated groove, wherein the first pin is eccentrically connected to the first rotatable portion, and wherein the first elongated groove is connected to the first reciprocating element.

Hereby, the first pin will move in a circumferential direction when the first rotatable portion rotates. As the first pin is arranged within the first elongated groove, the pin will move linearly between the end portions of the first elongated groove, thereby providing the linear reciprocating motion of the reciprocating element. The first elongated groove is preferably extending vertically such that the first pin moves up and down between the end portions. The "end portions" should be construed as positions within the elongated groove where direction of movement of the first pin changes.

It should also be readily understood that the elongated groove may be arranged in different ways. For example, the elongated groove may be arranged as an elongated through hole, or as an elongated groove in the form of a recess, i.e. a non-through hole.

According to an example embodiment, the first elongated groove may be elongated in a direction substantially perpendicular to the extension of the first reciprocating element. As described above, the first pin here moves in a vertical direction between an upper end portion and a lower end portion of the first elongated groove.

According to an example embodiment, the second interconnecting portion may comprise a second elongated groove and a second pin, the second pin being slidable between end portions of the second elongated groove, wherein the second pin is eccentrically connected to the second rotatable portion, and wherein the second elongated groove is connected to the second reciprocating element.

The same effects and features as described above for the first interconnecting portion is also applicable for the second interconnecting portion. Thus, the first and second interconnecting portions may be arranged as symmetric parts.

According to an example embodiment, the coupling arrangement may further comprise first and second support brackets connected to the first reciprocating element on a respective side of the first rotatable portion.

The support brackets are advantageously connected to stationary components of e.g. a vehicle at which the coupling arrangement is provided. Hereby, the coupling element is sufficiently connected to the stationary component.

According to an example embodiment, the first and second support brackets may be slidably connected to the first reciprocating element for allowing the linear motion between the first reciprocating element and the first and second support brackets, respectively.

Thus, the reciprocating element moves within a through hole of the first and second support brackets. Preferably, the interface between the through hole and the reciprocating element comprises some sort of low friction element.

According to an example embodiment, the first and second brackets may define respective end positions for the amplitude of the linear motion of the first reciprocating element.

Accordingly, the linear reciprocating movement will have well defined end positions, which will thus also restrict the rotation of the first rotatable shaft.

According to an example embodiment, the coupling arrangement may further comprise third and fourth support brackets connected to the second reciprocating element on a respective side of the second rotatable portion.

The third and fourth support brackets may preferably be arranged in a similar manner as the first and second support brackets. Thus, effects and features of the third and fourth support brackets are largely analogous to those described for the first and second support brackets.

According to an example embodiment, the coupling arrangement may be a steering column coupling, the steering column coupling being connectable between a first rotatable shaft in the form of an upper steering column connectable to a steering wheel of a vehicle, and a second rotatable shaft in the form of a lower steering column connectable to wheels of the vehicle.

Using the coupling arrangement for the application of a steering column coupling, a particular advantage is that an increased flexibility in moving the steering wheel in both the angular and the axial directions is achieved. Hereby, simplified retraction of the steering column is achieved, i.e. the steering column can be retractable in a simplified manner. As a consequence, the steering wheel can be adjusted to a particular position, which position is unique for each driver of the vehicle. An improved safety is hereby achieved since e.g. potential airbag deployment can be adjusted individually for each driver.

It should be noted that the wording "an upper steering column connectable to a steering wheel of a vehicle" should not be construed such that the upper steering column is directly connected to the steering wheel. Naturally, intermediate elements may be present between the upper steering column and the steering wheel. In a similar vein, the wording "a lower steering column connectable to wheels of the vehicle" should not be construed such that the lower steering column is directly connected to the wheels. As an example, the lower steering column can be connected to the wheels of the vehicle via e.g. a wheel axle, a rack-and-pinion connection, etc.

According to a second aspect, there is provided a vehicle comprising a first rotatable shaft, a second rotatable shaft and a coupling arrangement according to any one of the embodiments described above in relation to the first aspect, the coupling arrangement being connected between the first and second rotatable shafts.

According to an example embodiment, the first rotatable shaft may be an upper steering column connected to a steering wheel of the vehicle, and the second shaft is a lower steering column connected to a pair of steerable wheels of the vehicle.

Effects and features of the second aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
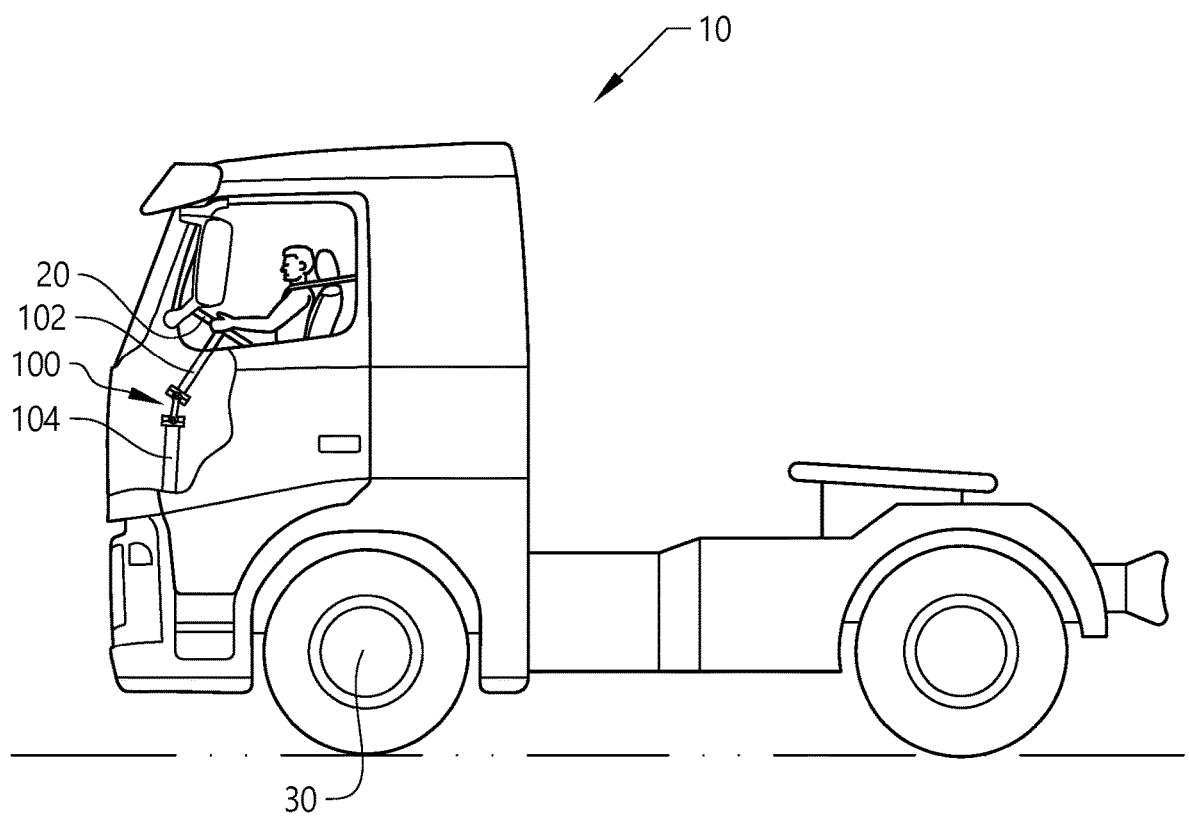
FIG. 1 is a lateral side view illustrating an example embodiment of a vehicle in the form of a truck.

The present disclosure will now be described more fully hereinafter with reference to the accompanying drawings, in which an exemplary embodiment is shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a steering wheel 20 for steering the front steerable wheels 30 of the vehicle. The vehicle 10 in FIG. 1 is particularly suitable for use of a coupling arrangement as will be described further below. In the example depicted in FIG. 1, the coupling arrangement 100 is arranged as a steering column coupling connected between a first rotatable shaft 102 in the form of an upper steering column connected to the steering wheel 20, and a second rotatable shaft 104 in the form of a lower steering column connectable to the wheels 30 of the vehicle 10.

Figure 2:
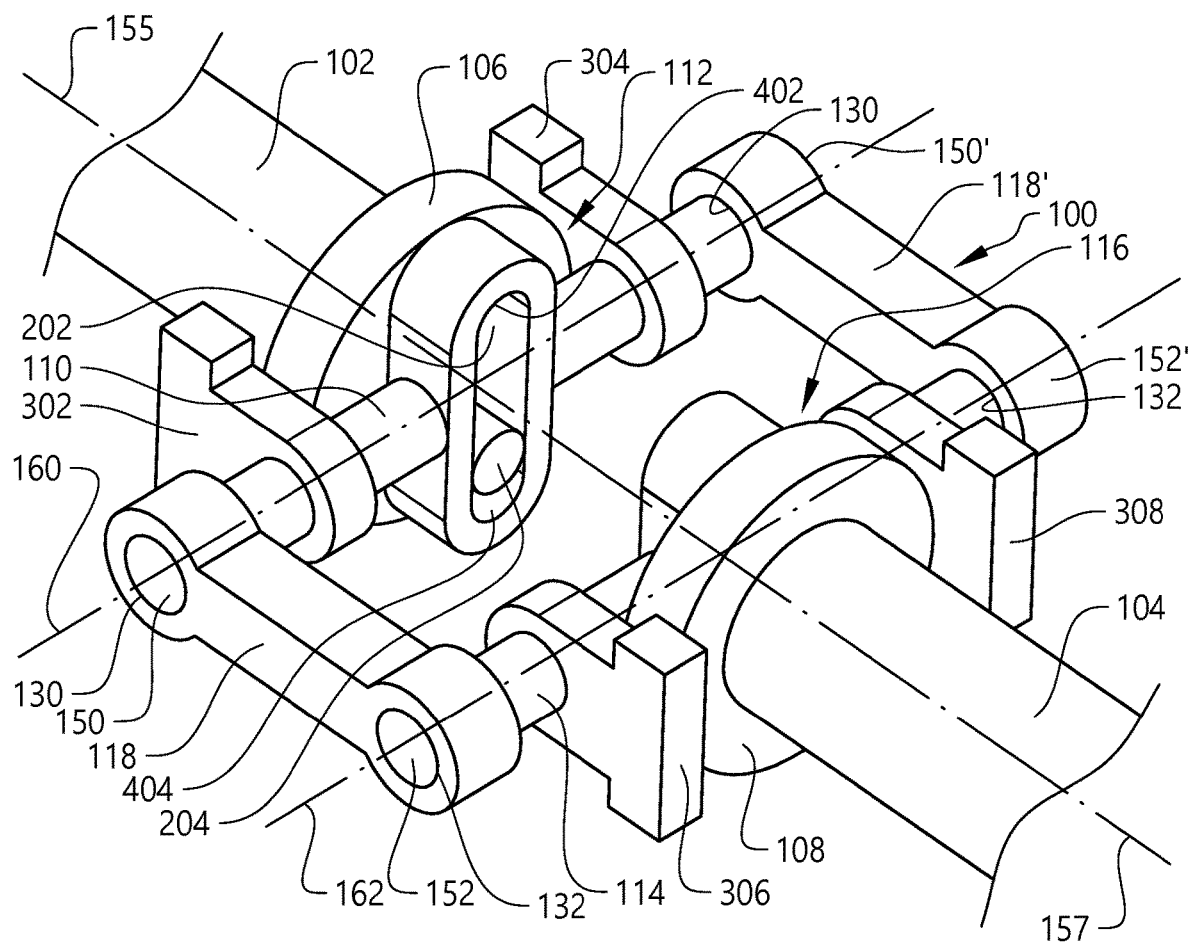
FIG. 2 is a perspective view of a coupling arrangement according to an example embodiment.
Figure 3:
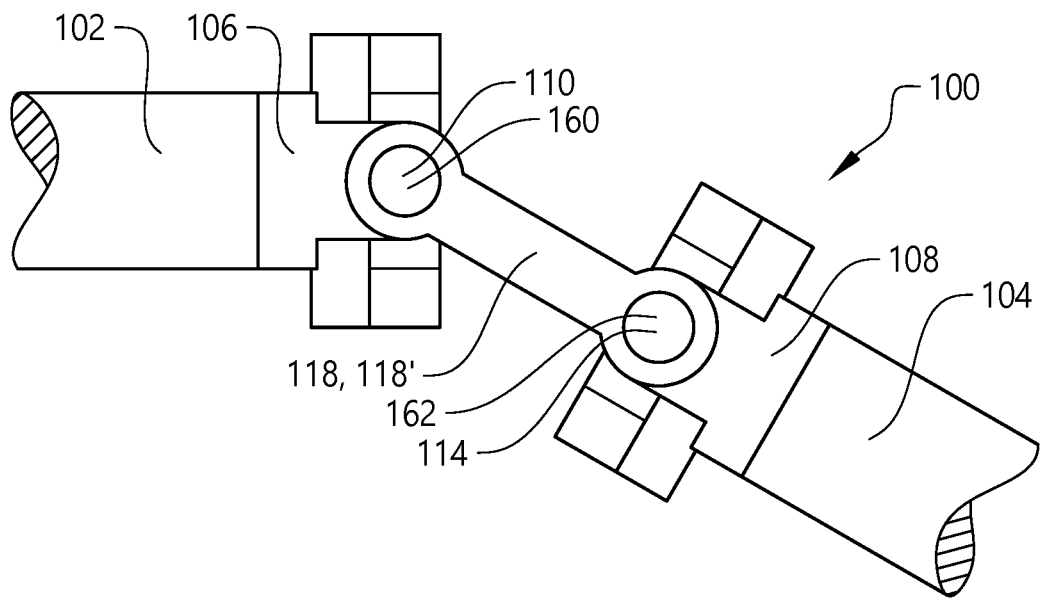
FIG. 3 is a side view of the coupling arrangement in FIG. 2 when exposed to an angular displacement.
Figure 4:
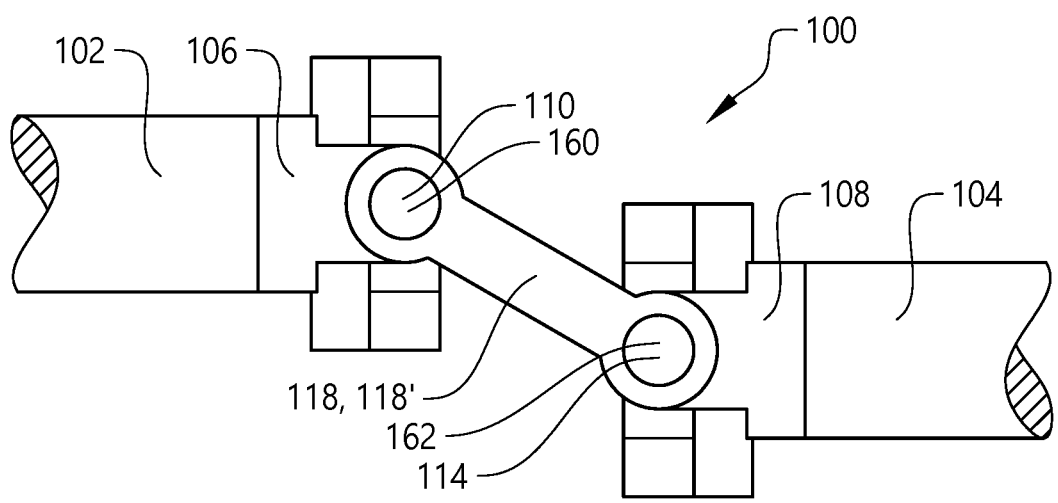
FIG. 4 is a side view of the coupling arrangement in FIG. 2 when exposed to a linear displacement.

In order to describe the coupling arrangement in further detail, reference is made to FIGS. 2-4. Starting with FIG. 2, which is a perspective view of the coupling arrangement according to an example embodiment. As can be seen, the coupling arrangement 100 comprises a first rotatable portion 106 which is connected to the first rotatable shaft 102. The coupling arrangement 100 further comprises a first interconnecting portion 112 and a first reciprocating element 110. As can be seen, the first interconnecting portion 112 comprises a first elongated groove 202 within a first elongated wall portion which is mechanically connected to the first reciprocating element 110, and a first pin 204 eccentrically connected to the first rotatable portion 106. The first pin 204 is preferably arranged to slide between an upper 402 and a lower 404 end portion of the first elongated groove 202.

Moreover, the coupling arrangement 100 further comprises a second rotatable portion 108 which is connected to the second rotatable shaft 104. The coupling arrangement 100 further comprises a second interconnecting portion 116 and a second reciprocating element 114. In a similar vein as for the first interconnecting portion 112, although not illustrated, the second interconnecting portion 116 comprises a second elongated groove within a second elongated wall portion which is mechanically connected to the second reciprocating element 114, and a second pin eccentrically connected to the second rotatable portion 108. The second pin is preferably arranged to slide between an upper and a lower end portion of the second elongated groove.

The coupling arrangement 100 further comprises a first 118 and a second 118' connecting element. The first 118 and second 118' connecting elements are each rotatably connected to the first 110 and second 114 reciprocating elements, respectively.

Hereby, the first reciprocating element 110 can rotate relative a first end portion 150, 150' of the first 118 and second 118' connecting elements, respectively. In other words, the first reciprocating element 110 can rotate relative the first 118 and second 118' connecting elements around a geometric axis 160 extending along the extension of the first reciprocating element 110. Preferably, the coupling arrangement 100 comprises a bearing arrangement 130 between the first reciprocating element 110 and the connecting elements 118, 118', respectively.

In a similar vein, the second reciprocating element 114 can here rotate relative a second end portion 152, 152' of the first 118 and second 118' connecting elements, respectively. In other words, the second reciprocating element 114 can rotate relative the first 118 and second 118' connecting elements around a geometric axis 162 extending along the extension of the second reciprocating element 114. Preferably, the coupling arrangement 100 comprises a second bearing arrangement 132 between the second reciprocating element 114 and the connecting elements 118, 118', respectively.

Moreover, the first 118 and second 118' connecting elements are preferably arranged to follow the linear reciprocating motion of the first 110 and second 114 reciprocating elements. When the first reciprocating element 110 moves along the geometric axis 160, the first 118 and second 118' connecting elements will move in the same direction, i.e. in the direction of the geometric axis 160. Hereby, the second reciprocating element 114 will move along geometric axis 162. A relative linear motion between the first 110 and second 114 reciprocating elements, and each of the connecting elements 118, 118' is thus prevented.

The following will now describe the motion pattern of the coupling arrangement 100 during use thereof. When the first rotatable shaft 102 is rotated, the first rotatable portion 106 will also rotate. When the first rotatable portion 106 rotates, the first interconnecting portion 112 will transform the rotating motion to a linear motion of the first reciprocating element 110. In detail, the first pin 204 will move in a circumferential direction of the first rotatable element 106 during rotation thereof. As the first pin 204 is slidably connected to the elongated groove 202, the first pin 204 will move between the end portions 402, 404 of the elongated groove 202, whereby the first reciprocating element 110 will move along the geometric axis 160, i.e. in a direction perpendicular to the axis 155 around which the first rotatable portion 106 rotates.

As described above, the first 118 and second 118' connecting elements are connected to the first reciprocating element 110 in such a way as to follow the reciprocating motion thereof. As such, when the first reciprocating element 110 linearly reciprocates, the first 118 and second 118' connecting elements also move linearly in the direction of the geometric axis 160. Hereby, the second reciprocating element 114 will be exposed to a linear motion, with the same amplitude and speed as the linear motion of the first reciprocating element 110. The second reciprocating element 114 will move linearly along the direction of the geometric axis 162.

The second reciprocating element 114 is connected to the second rotatable portion 108 by means of the second interconnecting portion 116. The second interconnecting portion 116 is preferably similar as the above described first interconnecting portion 112. The linear reciprocating motion of the second reciprocating element 114 is thus transformed into a rotational motion of the second rotatable portion 108 by means of the second interconnecting portion 116. The linear motion of the second reciprocating element 114 is preferably a direction which is perpendicular to the axis 157 around which the second rotatable portion 108 rotates.

By means of the above, the first 106 and second 108 rotatable portions will rotate in the same direction relative its respective axis 155, 157 and with the same rotational velocity.

As further depicted in FIG. 2, the coupling arrangement also comprises a first 302, second 304, third 306 and fourth 308 support brackets. The first 302 and second 304 support brackets are slidably connected to the first reciprocating element 110 at a respective side of the first rotatable portion 106, while the third 306 and fourth 308 support brackets are slidably connected to the second reciprocating element 114 at a respective side of the second rotatable portion 108. The support brackets 302, 304, 306, 308 can define end portions for the amplitude of the linear motion of the first and second reciprocating elements, respectively.

The support brackets are arranged to connect the coupling arrangement to one or more stationary portions. When using the coupling arrangement 100 as a steering column coupling, the third 306 and fourth 308 support brackets are preferably fixedly connecting the coupling arrangement 100 in a particular position, while the first 302 and second 304 support brackets are connected to an adjustable portion such that the position of the steering wheel can be adjusted.

Reference is now made to FIG. 3 which is a side view of the coupling arrangement 100 described above in relation to FIG. 2. In particular, the coupling arrangement 100 in FIG. 3 is exposed to an angular displacement. As can be seen in FIG. 3, the first 118 and second 118' connecting elements have been rotated around the first reciprocating element 110, i.e. rotated around the geometric axis 160. In other words, the first reciprocating element 110 and the connecting elements 118, 118' are rotated relative each other. The second reciprocating element 114 has however not been rotated relative the connecting elements 118, 118'. As such, an angular displacement between the first rotatable shaft 102 and the second rotatable shaft 104 is achieved.

With reference to FIG. 4, which is a side view of the coupling arrangement in FIG. 2 when exposed to a linear displacement. As can be seen in FIG. 4, the first 118 and second 118' connecting elements are rotated around the first reciprocating element 110 in a similar manner as for the example depicted in FIG. 3. However, the first 118 and second 118' connecting elements are also rotated around the second reciprocating element 114, i.e. around the geometric axis 162. Hereby, the first 102 and second 104 rotatable shafts are purely linearly displaced.

Although not depicted, a combined angular and linear displacement may of course be achieved by means of the above described coupling arrangement. This is achieved by rotating the first 110 and second 114 reciprocating elements with different amplitude, such that e.g. the first reciprocating element 110 is rotated around the geometric axis 160 to a larger extent compared to the rotation of the second reciprocating element 114 around its geometric axis 162.

It is to be understood that the present disclosure is not limited to the embodiments described above and illustrated in the drawings; rather, the skilled person will recognize that many changes and modifications may be made within the scope of the appended claims.

The invention claimed is:

1. A coupling arrangement for connection between a first rotatable shaft and a second rotatable shaft, the coupling arrangement comprising:
    a first rotatable portion connectable to the first rotatable shaft;
    a first reciprocating element mechanically connected to the first rotatable portion at a first interconnecting portion for transforming a rotating motion from the first rotatable portion to a linear motion of the first reciprocating element;
    a second rotatable portion connectable to the second rotatable shaft;
    a second reciprocating element mechanically connected to the second rotatable portion at a second interconnecting portion for transforming a linear motion from the second reciprocating element to a rotating motion of the second rotatable portion; and
    a connecting element rotatably connected to each of the first reciprocating element and the second reciprocating element for allowing a relative rotation between the connecting element and the first and second reciprocating elements, respectively,
    wherein the first interconnecting portion comprises a first elongated groove and a first pin, the first pin being slidable between end portions of the first elongated groove, wherein the first pin is eccentrically connected to the first rotatable portion, and wherein the first elongated groove is connected to the first reciprocating element.

2. The coupling arrangement of claim 1, wherein the connecting element is a first connecting element, the coupling arrangement further comprising a second connecting element rotatably connected to each of the first reciprocating element and the second reciprocating element, wherein the first and second connecting elements are positioned on a respective end portion of the first and second reciprocating elements.

3. The coupling arrangement of claim 1, wherein a direction of the linear motion of the first reciprocating element is perpendicular to an axis around which the first rotatable portion rotates.

4. The coupling arrangement of claim 1, wherein a direction of the linear motion of the second reciprocating element is perpendicular to an axis around which the second rotatable portion rotates.

5. The coupling arrangement of claim 4, wherein the first elongated groove is elongated in a direction substantially perpendicular to the extension of the first reciprocating element.

6. The coupling arrangement of claim 1, further comprising first and second support brackets connected to the first reciprocating element on a respective side of the first rotatable portion.

7. The coupling arrangement of claim 6, wherein the first and second support brackets are slidably connected to the first reciprocating element for allowing the linear motion between the first reciprocating element and the first and second support brackets, respectively.

8. The coupling arrangement of claim 6, wherein the first and second brackets define respective end positions for the amplitude of the linear motion of the first reciprocating element.

9. The coupling arrangement of claim 1, further comprising third and fourth support brackets connected to the second reciprocating element on a respective side of the second rotatable portion.

10. The coupling arrangement of claim 1, wherein the coupling arrangement is a steering column coupling, the steering column coupling being connectable between a first rotatable shaft in the form of an upper steering column connectable to a steering wheel of a vehicle, and a second rotatable shaft in the form of a lower steering column connectable to wheels of the vehicle.

11. A vehicle comprising a first rotatable shaft, a second rotatable shaft and the coupling arrangement of claim 1, the coupling arrangement being connected between the first and second rotatable shafts.

12. The vehicle of claim 11, wherein the first rotatable shaft is an upper steering column connected to a steering wheel of the vehicle, and the second shaft is a lower steering column connected to a pair of steerable wheels of the vehicle.

* * * * *